(12) United States Patent
Vilinskis et al.

(10) Patent No.: US 9,750,239 B2
(45) Date of Patent: Sep. 5, 2017

(54) TRACKING SYSTEM AND METHOD

(71) Applicant: Infestation Tracking Systems Pty. Ltd., Kilmore (AU)

(72) Inventors: Arron Vilinskis, Kilmore (AU); Troy Awad, Melton South (AU)

(73) Assignee: Infestation Tracking Systems Pty. Ltd., Kilmore (AU)

( * ) Notice: Subject to any disclaimer, the term of this patent is extended or adjusted under 35 U.S.C. 154(b) by 113 days.

(21) Appl. No.: 14/936,583

(22) Filed: Nov. 9, 2015

(65) Prior Publication Data

US 2016/0057989 A1    Mar. 3, 2016

Related U.S. Application Data

(63) Continuation of application No. PCT/AU2014/000518, filed on May 14, 2014.

(30) Foreign Application Priority Data

May 14, 2013    (AU) ................................ 2013901697

(51) Int. Cl.
*G08B 1/08* (2006.01)
*A01M 31/00* (2006.01)
(Continued)

(52) U.S. Cl.
CPC .......... *A01M 31/002* (2013.01); *A01M 1/026* (2013.01); *A01M 99/00* (2013.01); *G06Q 10/10* (2013.01); *G06Q 50/00* (2013.01)

(58) Field of Classification Search
CPC .... A01M 1/026; A01M 31/002; A01M 99/00; G06Q 10/10; G06Q 50/00
(Continued)

(56) References Cited

U.S. PATENT DOCUMENTS 6,385,622 B2    5/2002    Bouve et al.
8,417,534 B2 *  4/2013    Belzer .................... G06Q 10/06
                                                       340/539.13
(Continued)

OTHER PUBLICATIONS

"The Bedbug Registry Home Page, iPhone application link and look up & report page," 2006, [online], [retrieved on Nov. 10, 2015], retrieved from the internet, <URL: http://bedbugregistry.com/>, 1 page.
(Continued)

*Primary Examiner* — Ojiako Nwugo
(74) *Attorney, Agent, or Firm* — Kilpatrick Townsend & Stockton LLP

(57) ABSTRACT

Disclosed is a tracking system comprising: a data receiver arranged to: i) receive work data indicative of at least a location of an infestation or other item of interest from a data provider, and ii) receive property data indicative of an address or location from a client device; a module arranged to: i) update an existing record in a database according to the received work data upon determining the record corresponds to the location based on a geographical matching process, ii) create a new record in the database according to the received work data upon determining that no record corresponding to the location exists based on a geographical matching process, and iii) retrieve a record from the database corresponding to the location upon determining that the record corresponds to the address based on a geographical matching process; and a data transmitter arranged to transmit the retrieved record to the client device for output to a user. A tracking method is also disclosed.

20 Claims, 5 Drawing Sheets

(51) Int. Cl.
*A01M 1/02* (2006.01)
*A01M 99/00* (2006.01)
*G06Q 10/10* (2012.01)
*G06Q 50/00* (2012.01)

(58) Field of Classification Search
USPC .......................................... 340/539.19; 702/2
See application file for complete search history.

(56) References Cited

U.S. PATENT DOCUMENTS

| | | | |
|---|---|---|---|
| 2005/0283314 A1* | 12/2005 | Hall | A01C 21/007 |
| | | | 702/2 |
| 2012/0237083 A1* | 9/2012 | Lange | G06K 9/00805 |
| | | | 382/103 |
| 2012/0259472 A1* | 10/2012 | Gilmore | A01G 1/001 |
| | | | 700/283 |
| 2014/0077969 A1* | 3/2014 | Vian | G08C 17/02 |
| | | | 340/870.02 |

OTHER PUBLICATIONS

International Search Report mailed Jun. 19, 2014 in PCT/AU/2014/000518, 3 pages.

* cited by examiner

TRACKING SYSTEM AND METHOD

CROSS-REFERENCES TO RELATED APPLICATIONS

This application is a continuation application of PCT application PCT/AU2014/000518 entitled "TRACKING SYSTEM AND METHOD," filed on May 14, 2014, which claims priority to Australian Patent Application No. 2013901697, filed on May 14, 2013, which are herein incorporated by reference in their entirety for all purposes.

FIELD OF THE INVENTION

The present invention is generally related to a tracking system and method and particularly, although not exclusively, related to a tracking system and method for termites and other applications.

BACKGROUND OF THE INVENTION

Colonies of pests such as termites can infest houses and other buildings and cause substantial structural and cosmetic damage. Such pests can also travel in search of a new food source, which means that buildings are proximal to infested buildings are potentially at risk. It can be difficult for property owners or other interested parties to know whether a property is at risk due to proximal infestations.

BRIEF SUMMARY OF THE INVENTION

In a first broad aspect the invention provides a tracking system comprising:
a data receiver arranged to: i) receive work data indicative of at least a location of an infestation or other item of interest from a data provider, and ii) receive property data indicative of an address or location from a client device,
a module arranged to: i) update an existing record in a database according to the received work data upon determining the record corresponds to the location based on a geographical matching process, ii) create a new record in the database according to the received work data upon determining that no record corresponding to the location exists based on a geographical matching process, and iii) retrieve a record from the database corresponding to the location upon determining that the record corresponds to the address based on a geographical matching process, and
a data transmitter arranged to transmit the retrieved record to the client device for output to a user.

In an embodiment, the geographical matching process compares a postcode in the record to a postcode in the work data or property data to determine whether the record corresponds to the work data or property data.

In an embodiment, the geographical matching process compares an area based on the record to an area based on the work data or property data to determine whether the record corresponds to the work data or property data.

In an embodiment, the area is defined by a circle centered on the location or address and with a predefined radius.

In an embodiment, the data is arranged to be displayed on a screen of the client device.

In an embodiment, the tracking system is arranged to display advertisements on the screen of the client device.

In an embodiment, the displayed advertisement is an advertisement for the data provider.

In an embodiment, the displayed advertisement is an advertisement related to the location of the data.

In an embodiment, the module is arranged to communicate via the internet with a smartphone or computer application installed on the client device.

In an embodiment, the module is arranged to communicate via the internet with a web browser installed on the client device.

In a second broad aspect the invention provides a tracking module arranged to:
update an existing record in a database according to received work data indicative of at least the location of an infestation or other item of interest upon determining the record corresponds to the location based on a geographical matching process,
create a new record in the database according to the received work data upon determining that no record corresponding to the location exists based on a geographical matching process, and
retrieve a record from the database according to received property data indicative of an address upon determining the record corresponds to the address based on a geographical matching process.

In a third broad aspect the invention provides a tracking method comprising:
receiving at a module work data indicative of at least the location of an infestation or other item of interest from a data provider,
modifying records in a database according to the received work data,
receiving at the module property data indicative of an address of a property or location from a client device,
retrieving data corresponding to the address from the records, and
transmitting the retrieved data to the client device for output to a user.

In an embodiment, the tracking method comprises determining that data corresponds to the address if the record relates to a property on the same street.

In an embodiment, the tracking method comprises determining that data corresponds to the address if the address falls within a risk area of the record.

In an embodiment, the tracking method comprises displaying the data on a screen of the client device.

In an embodiment, the tracking method comprises displaying advertisements on the screen of the client device.

In an embodiment, the advertisement is an advertisement for the data provider.

In an embodiment, the advertisement is an advertisement related to the location of the infestation data.

In an embodiment, the tracking method comprises communicating between the module and a smartphone or computer application installed on the client device via the internet.

In an embodiment, the tracking method comprises communicating between the module and a web browser installed on the client device via the internet.

In a fourth broad aspect the invention provides a computer program code which when executed implements the method of the third broad aspect.

In a fifth broad aspect the invention provides a computer readable medium comprising the computer program code of the fourth broad aspect.

BRIEF DESCRIPTION OF THE DRAWINGS

In order that the invention may be more clearly ascertained, embodiments will now be described, by way of example, with reference to the accompanying drawing, in which.

DETAILED DESCRIPTION OF THE INVENTION

The invention is generally related to a tracking system and method that is arranged to record or track the locations of known pest infestations, such as termite colonies, in areas of interest, such as residential areas. However, the tracking system may have further applications, such as in tracking the location of instances of asbestos in houses, tracking disease in livestock, or tracking disease in plants such as crops. Pest infestations are typically recorded by uploading, modifying or deleting data in a database. The tracking system may be used by a number of different types of users, such as: i) primary users who are typically homeowners or occupiers and who are interested in the risk of infestation to their property, ii) pest controllers who typically provide infestation data to the system based on work they do, and iii) third party users such as home loan lenders who typically use the system to make a more informed commercial decision in relation to the property or area of interest.

In this specification, embodiments are described in relation to recording and controlling termite infestations, but the invention may be applied to tracking and controlling any other suitable pest infestation, such as cockroach, weevil, rodent or poisonous spider infestations, or any combination of the same. In some embodiments, the infestation tracking system may be used to record and control plant infestations, such as Echium plantagineum (or Patterson's Curse) weed infestations.

Figure 1:
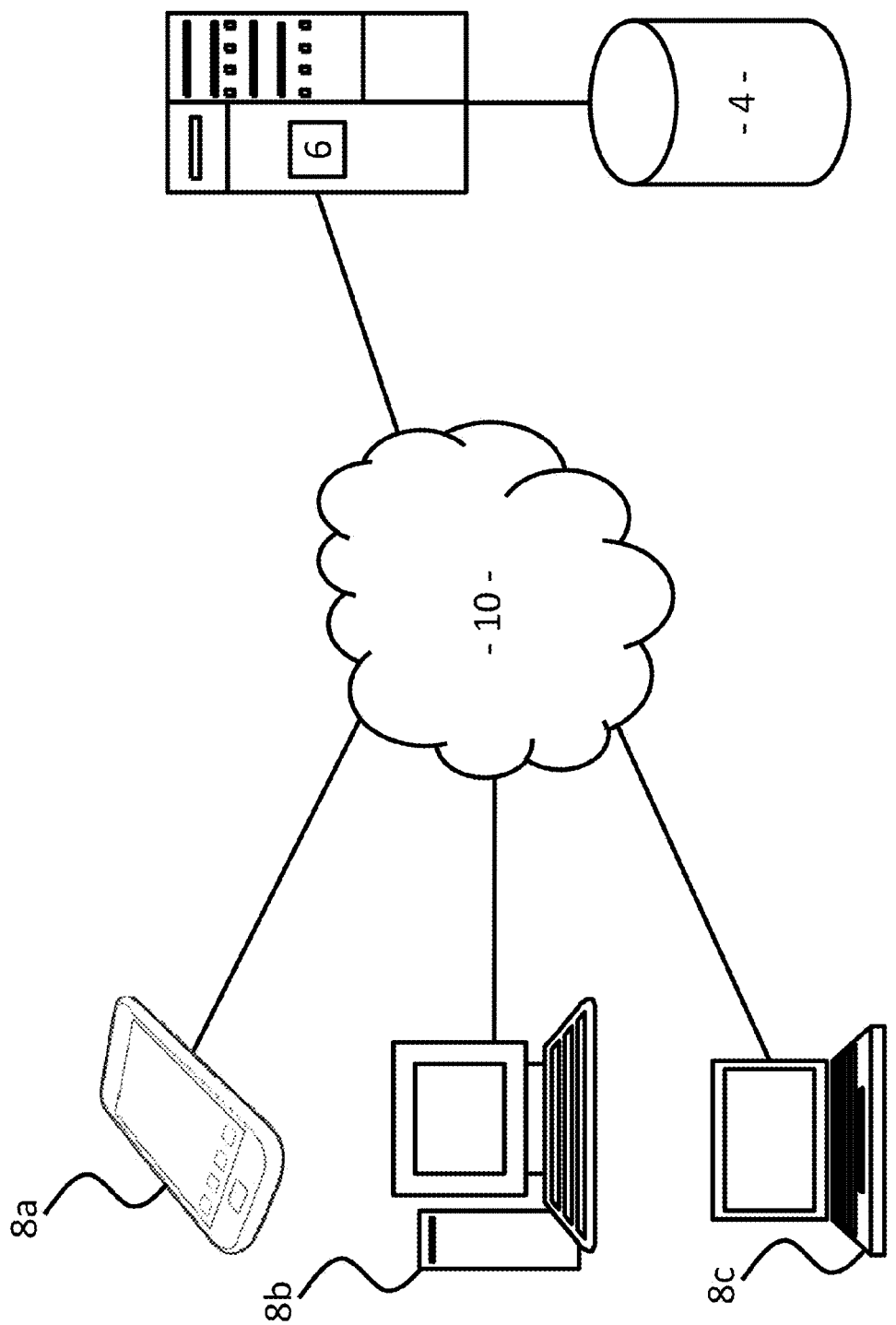
FIG. 1 is a block diagram of an embodiment of a tracking system of the invention.

Referring to FIG. 1, a tracking system may be provided on a server 2 that is in communication with an associated database 4. The server 2 comprises: i) a data receiver arranged to receive data from a user or data provider, and ii) a data transmitter arranged to transmit data to a user or a client device 8. The server 2 also comprises a module 6 arranged to: i) receive inputs, such as data requests from users, new or modified data from data providers, and raw data from the database 4, ii) process received data requests, new data and raw data, and iii) transmit outputs, such as infestation or other data, to users. However, the module 6 may be provided in any suitable manner or as a part of any suitable computer or machine.

The module 6 is typically implemented using software but alternatively may be implemented using hardware or a combination of software and hardware, or in any other suitable manner. The module 6 may be implemented using any suitable computer program code or any suitable programming language. The computer program code is typically stored on a computer readable medium such a hard disk drive (HDD), solid-state drive (SSD) or random access memory (RAM).

A user typically accesses the infestation tracking system through a client device 8 such as a mobile phone or computer that is arranged to communicate with the module 6 over a suitable network 10 such as a local area network (LAN) or wide area network (WAN), but typically the client device 8 will communicate with the infestation tracking system over the internet. The server 2 comprising the module 6 and the client device 8 may be connected to the network 10 through a wired connection or through a wireless connection.

A user may access or interact with the infestation tracking system using a mobile application installed on a smartphone 8a or an application installed on a desktop computer 8b or laptop computer 8c. Alternatively, a user may access or interact with the infestation tracking system by navigating to an associated infestation tracking system website on a web browser installed on a smartphone 8a, desktop computer 8b or laptop computer 8c. However, a user may access or interact with the infestation tracking system in any other suitable manner.

Figure 2:
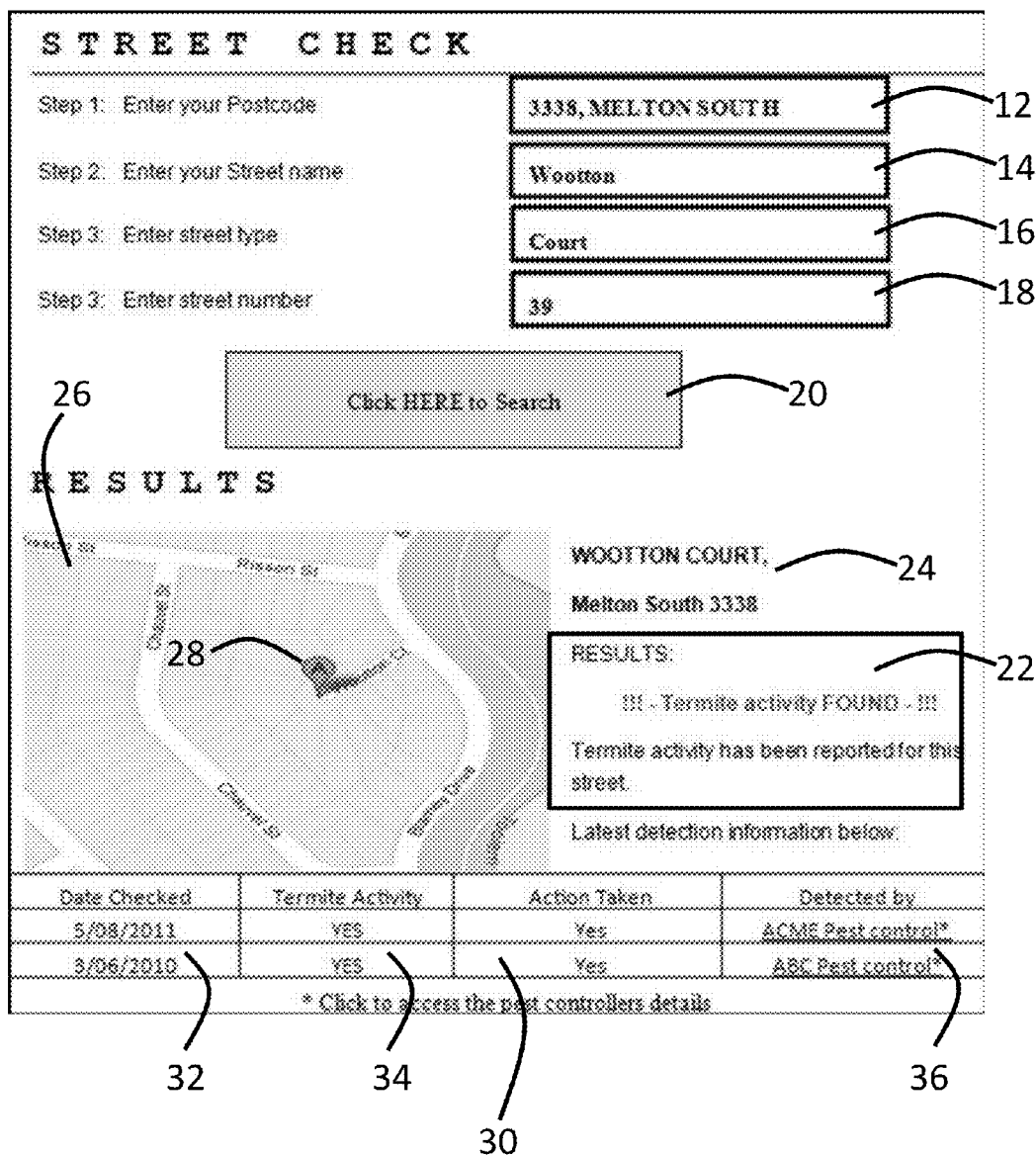
FIG. 2 is an illustration of a GUI presented to a user of the invention of FIG. 1.

FIG. 2 illustrates a graphical user interface (GUI) of an embodiment that is provided to a user, such as a primary user, via a smartphone or computer. The GUI is arranged to receive property-location data (herein property data) for transmission to the module. Property data may be received from the user or input by the user in any suitable manner. The primary user may be interested in known termite infestation activity in, around or near a property, for example, that they own because such infestations inter alia may: i) effect the value of the property, ii) indicate potential damage to the property caused by such infestations, and iii) indicate proactive pest control may be required in cases where there are nearby infestations. The GUI may be implemented on a client device as part of an application, in a web browser or in any other suitable manner.

In embodiments where the tracking system is used to track the location of asbestos, the primary user may be interested because the presence of asbestos may: i) effect the value of the property, and ii) indicate the exposure of residents to potential health risks. In embodiments where the infestation tracking system is used in agriculture, such as to track an infestation or disease in livestock or crops, the primary user may be interested because the presence of such an infestation or disease may: i) effect the value of the agricultural asset, ii) indicate that some sort of action such as moving livestock or spraying crops may need to occur, iii) indicate that their agricultural asset is at risk of infection.

In an embodiment, the GUI may provide a postcode text box 12 arranged to allow a user to enter or input the postcode of the property of interest. The postcode text box 12 may automatically update itself with the name of a suburb, locality, district or other suitable geographic subdivision upon the entry of a valid postcode, and such a name may be extracted from a database or procured in any other suitable manner. The GUI may also provide a street-name text box 14 arranged to allow a user to enter the street name of the property of interest. The entered street name may be checked against a database of street names for validity.

The GUI may also provide a street-type text box 16 arranged to allow a user to enter the street type, such as "road", "street", "avenue", "court", "crescent", "lane" and so on. Alternatively, the GUI may provide a drop-down list or any other suitable GUI widget or control element so that a user can input the street type. The GUI may also provide a number text box 18 arranged to allow a user to enter a number that corresponds to or identifies the property of interest, such as a house number or street number that is part of a postal or physical address. The number data may or may not include information pertaining to a particular property in a multi-property building such as an apartment building or a block of flats or units. The GUI may also provide a search button 20 that causes the client device to communicate or interact with the module, as will be discussed in more detail below.

The property data for a particular user query may comprise the received postcode, street name, street type and number data; those variables may be parsed, encoded or processed in any other suitable manner for storage or transmission. However, the property data may comprise any suitable data that can uniquely identify a property.

In other embodiments, the GUI may be arranged in any suitable manner such that a user can uniquely identify and input property data related to a property of interest. For example, in an embodiment, the text boxes may be presented with the number text box 18 at the top of the GUI followed by the street-name text box 14, then the street-type text box 16 and finally the postcode text box 12. In another embodiment, the user may be provided with an interactive map that allows for interaction such as zooming and panning. In this embodiment, the user can input property data details relating to the property of interest by zooming and panning on the map and then tapping or clicking on a representation of the property, when displayed.

Alternatively or additionally, the location of an infestation may be recorded by using a longitude and latitude, which may be useful, for example, in agricultural applications, because a large farm may have only one address attached to it.

Alternatively or additionally, the client device may use GPS to identify the location of a property. For example, a user such as a pest controller may physically enter a property to undertake an inspection and use a GPS module of a smartphone to enter his location into the GUI. The GUI may allow for the user to check that the address or location is correct before that information is submitted.

The infestation tracking system may check that the received property data is valid and return an error message if the property data is found to be invalid. For example, upon a user inputting property data (for example, by entering a street address and clicking the search button 20, or by tapping on a property on a displayed map), the client device may transmit the property data to the module over the network. Upon receiving the property data, the module may check it against any suitable database. Such a database may be stored locally (for example, in a memory device associated with the server) or accessed over the network.

The infestation tracking system is arranged to output or display infestation data to a user such as a primary user. Upon a user inputting property data, the client device typically transmits the property data to the module over the network. Upon receiving the property data, the module may decode, unparse, compose, serialise or process the property data in any suitable and required manner, which may depend on how the property data was processed for transmission, such that it can be compared to the infestation data set, which is typically stored in the database, although it may be stored remotely. The infestation data set typically comprises a plurality of infestation records, each of which may be current or historical.

Each infestation record may comprise data pertaining to: i) the address of the infestation (herein address data), which may include a postcode, street name, street type and street number, ii) details of the pest controller that found or recorded the infestation (herein pest controller data), which may include a company name, phone number, fax number, email address, physical address and website address, iii) a variable that indicates whether pest control measures were undertaken, and iv) the date that the entry was recorded (herein date data). There may be multiple infestation records relating to one address, which typically indicates that the corresponding property has been surveyed or treated more than once.

Similar data may be provided in asbestos, agricultural or other applications, though it will typically be related to the application in question. For example, in an asbestos application, data may pertain to whether work has been done to remove any asbestos.

The infestation tracking system or module is arranged to compare the received property data with the stored address data. The infestation tracking system or module is further arranged to retrieve any infestation data or records that have address data that matches or corresponds to the received property data. In particular, the module may execute a geographical matching process to determine whether the property data corresponds to one or more infestation records. The geographical matching process typically comprises comparing one or more of the postcodes, street names, or risk areas of the infestation record and the property data. However, the geographical matching process may be executed in any similar manner. The risk area may be defined by a circle centered on the address and having a predefined radius, but the risk area may be defined in any other suitable manner. The module may parse, encode or process the infestation record in any suitable manner for transmission across the network to the client device.

The application or website running on the client device is arranged to update the GUI displayed to the user, and typically does so upon receiving an infestation record. In an embodiment, the GUI may be updated to display: i) notification text 22 that indicates that one or more infestation records exists for the address of the property in question, ii) address text 24 that reproduces the address of the property in question, iii) a map 26 centered on and displaying an area around the property, with a location marker 28 marking the property, iv) a table 30 that displays for each received infestation record the date data 32, an indication 34 of whether pest control measures were undertaken (which depends on the action variable), and an indication of the pest controller data 36, which may be the name of the company that reported the infestation. The GUI may also be controlled to display notification text that indicates that no records exist if no infestation record is received.

Figure 3:
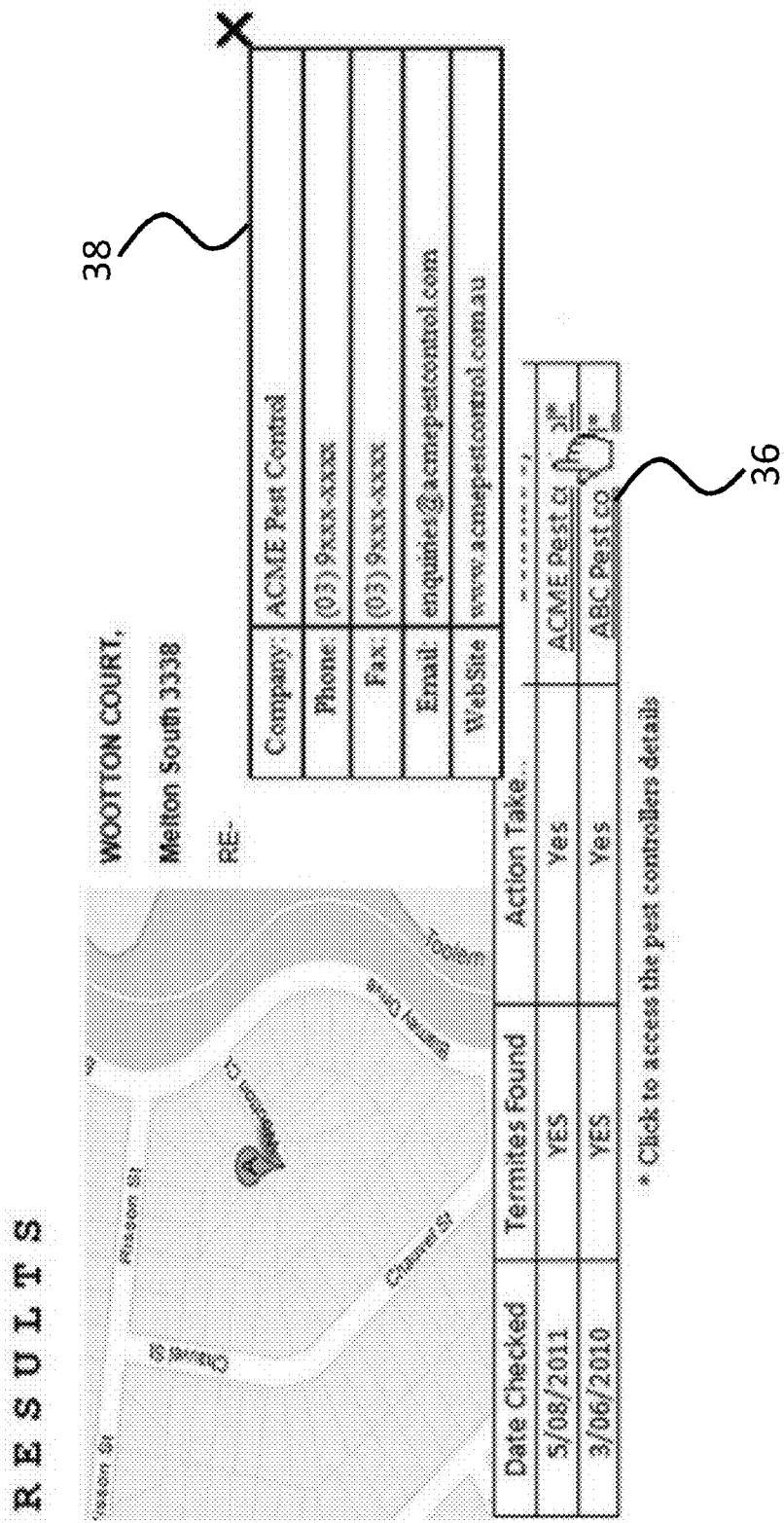
FIG. 3 is an illustration of the GUI of FIG. 2 after a user has clicked on a link to pest controller information.

Referring to FIG. 3, the indication of the pest controller data 36 may be provided as a link which, when clicked on or tapped, causes the display of further information about the pest controller via a pop-up box 38. Such further information may include the pest controller's company name, phone number, fax number, email address, physical address and website address. Alternatively, further information may be provided in a hover box or tooltip. When the GUI is provided as part of a website or computer application, the displayed (i) website and (ii) email address may be provided as clickable links that (i) navigate to the pest controller's website and (ii) open an email compose window including the pest controller's email address and an optional subject message or body message or both. A mobile application may have similar functionality in addition to the feature of calling a pest controller upon a user tapping a tappable phone number link. However, pest controller data may be provided or displayed to a user in any suitable manner.

Figure 4:
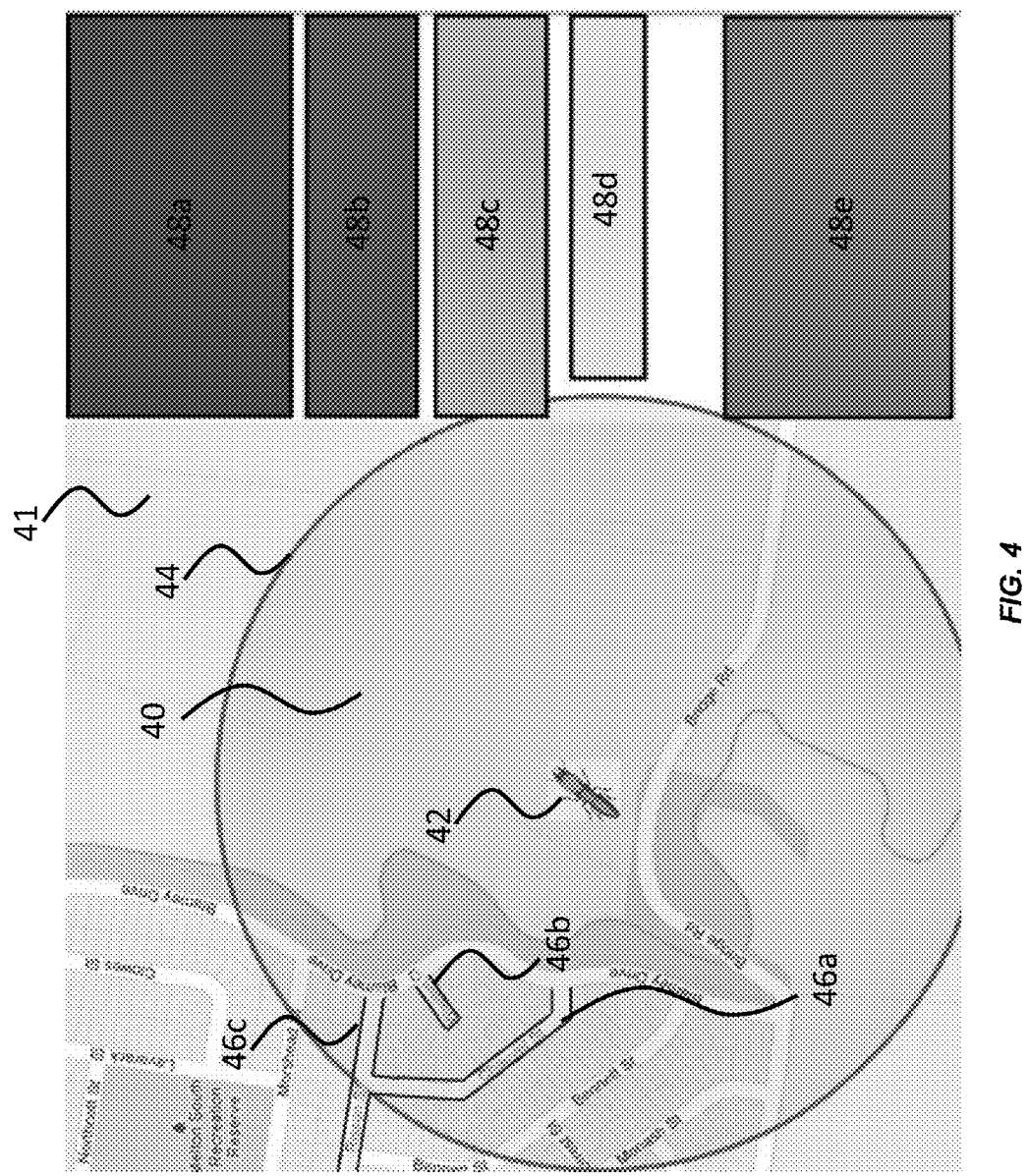
FIG. 4 is an illustration of an alternate GUI of the invention of FIG. 1.

Referring to FIG. 4, in an embodiment, the GUI may be controlled to highlight one or more risk areas 40 on a displayed map 41, where the risk areas 40 indicate the potential for infestation or damage based on known infestations. The GUI is typically controlled to highlight one or more risk areas 40 based on the received property data. For example, termites may be known to travel 500 meters from their nest to a food source and, as such, properties within 500 meters from a nest may be at risk. In this embodiment, the GUI is controlled to: i) mark the location of the nest, for example, with an icon 42, ii) plot a circle 44 based on a radius, such as 500 meters, with a centre point (i.e. the nest or icon 42), and iii) transparently shade the area within the circle 44 to indicate the risk area 40. In some embodiments, the GUI does not display the nest or an icon 42. In some embodiments, the radius of the circle may change depending on the pest or species in question and characteristics of a known nest or infestation, for example, according to a pest controller that has surveyed the site. For example, simply icons with no circle or radius may be displayed in asbestos applications because asbestos installations are static and do not travel. However, icons with a circle or radius may be used in agricultural application because livestock itself or livestock disease or crop disease can move.

In some embodiments, shapes other than circles may be used, such as polygons or free-form paths. The risk area may be shaded or displayed in any suitable manner. In some embodiments, the received property data may be in the vicinity of two or more infestations, in which case a corresponding two or more risk areas 40 may be displayed. In such embodiments, the property indicated by the property data may fall within an overlapping section of both or all displayed risk areas.

To give a user a better indication of the risk of infestation, the GUI may be controlled to highlight one or more infested streets 46. Infested streets 46 are typically streets where: i) all or part of the street fall within the risk area 40, and ii) there is an infestation record in the database for at least one house on the street. For example, in FIG. 3 Chauvel Street 46a, Wootton Court 46b and Risson Street 46c are identified as infested streets 46 because they are highlighted with black borders, which means that they each fully or partially within the risk area 40 and have an infestation record for at least one property. Highlighting infested streets 46 may be undertaken in any suitable manner.

In an embodiment, the GUI is arranged to allow a user to control how the map 41 is displayed, for example, by zooming in and out of the map and panning, translating or scrolling the map. Different known infestations may be highlighted or displayed in any suitable manner as the user changes how the map 41 is displayed.

The GUI may comprise several advertising spaces 48 that may be used in any suitable manner. In an embodiment, a first advertising space 48a displays an advertisement for the pest controller that most recently entered, updated or modified an infestation record within the risk area 40. Second 48b and third 48c advertising spaces may similarly display advertisements for other unique pest controllers that second and third most recently entered, updated or modified an infestation record within the risk area 40, respectively. A fourth advertising space 48d may provide a link to information about all of the pest controllers that are registered or have worked within the risk area 40. A fifth advertising space 48e may allow for the display of any suitable advertisement, such as advertisements for local businesses, where particular advertisements may be displayed based on the received property data or postcode.

The GUI illustrated in FIG. 4 may be provided to a user through a web browser installed on a computer or smartphone, a stand-alone application installed on a computer, or a mobile application installed on a smartphone.

Figure 5:
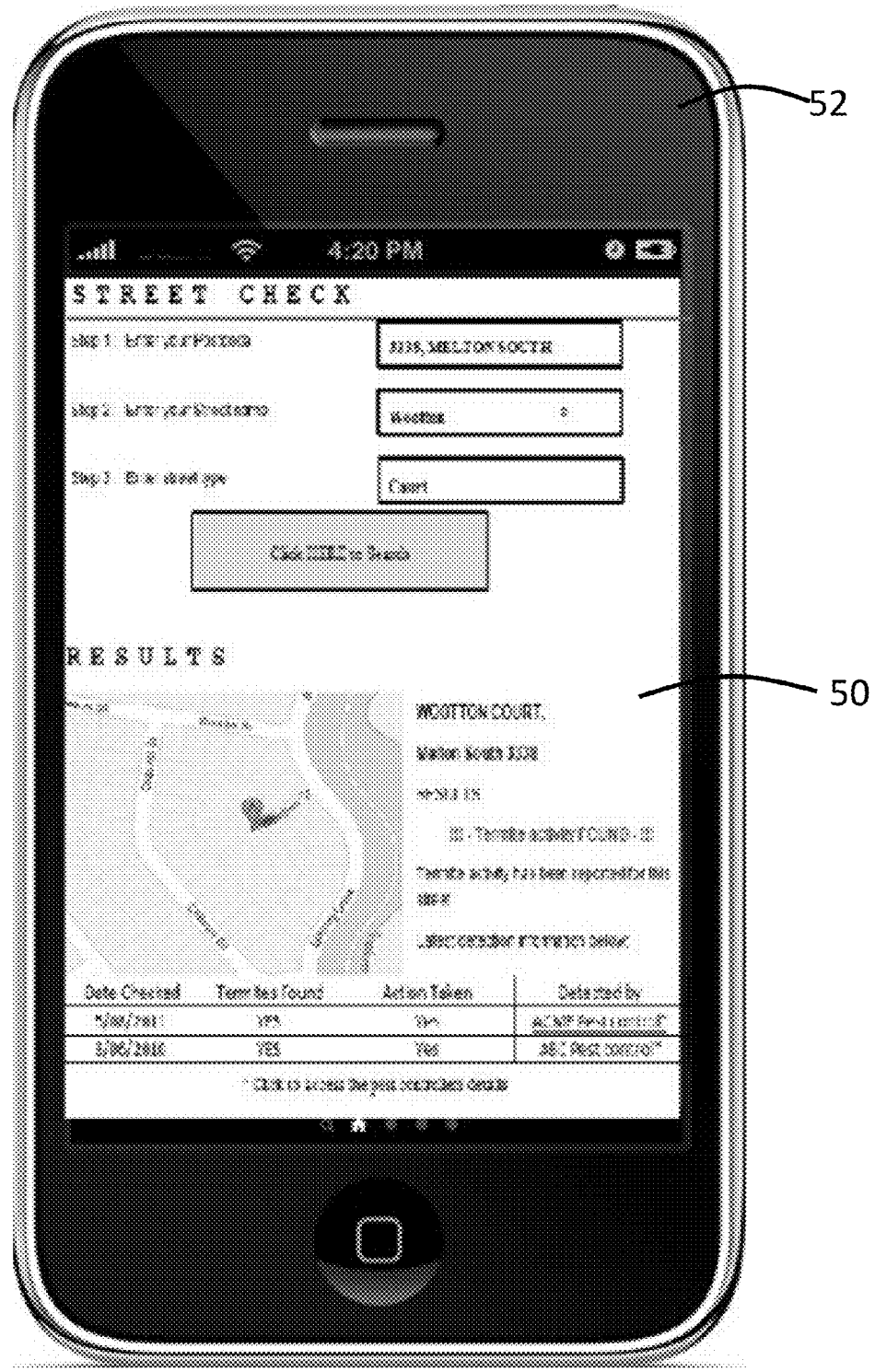
FIG. 5 is an illustration of a GUI of an embodiment of the invention of FIG. 1 presented on a smartphone.

Referring to FIG. 5, the infestation tracking system may be accessed by a user via a smartphone application 50 installed on a smartphone 52. The smartphone application 50 may provide a GUI according to any relevant embodiment described herein or in any other suitable manner, and the GUI may be displayed after a user logs into an account upon opening the application 50. The smartphone application 50 may be provided to users for free, a one-off fee, a recurring fee, or in any other suitable manner. The smartphone application 50 is typically downloaded from an application store for installation on a smartphone 52, but it may be provided or procured in any suitable manner. The smartphone application 50 may be provided to users from the Google Play application store for smartphones running the Android operating system, the Windows Phone Store for smartphones running the Windows Phone operating system, the Apple App Store for smartphones running the iOS operating system, or any other suitable application store.

In an embodiment where provided for free, the smartphone application 52 is configured to allow a user to perform one search per week, after which searching functionality is disabled for the rest of the week. Alternatively, the smartphone application 52 may be configured to allow a user to perform one search per day, two searches per day, or any other suitable number of searches over any suitable time period. The smartphone application 52 may allow a user to pay for single or multiple additional searches, for example, through an in-app purchase. Additional features may also be unlocked in the free version of the smartphone application 52, for example, through in-app purchases. In an embodiment where provided for a fee, the smartphone application 52 is configured to allow a user to perform an unlimited amount of searches per day, with no restrictions. Additional features may be provided at the time of purchase of the smartphone application 52, or may be provided on the payment of a further fee, for example, through an in-app purchase. However, the app, features of the app, the number of searches (in total or over a time period), searchable postcodes, reports, and alarms may be charged for (or not charged for) in any suitable manner.

The infestation tracking system administrator may generate revenue through selling smartphone or computer applications, in-app purchases, advertising, subscription or registration fees, or by any other suitable means.

In an embodiment, a user can subscribe to an alert system that will notify the user upon the creation of new infestation data that is relevant to them. In this embodiment, the user typically creates a user account with the infestation tracking system, for example, by registering a username and password. The user may also provide property data related to a property of interest, and contact information so that a notification can be delivered. The infestation tracking system may be arranged to check whether all registered properties of interest are in a risk area or on a street that partially in a risk area upon the creating of new infestation data (which is typically uploaded by a pest controller), and to notify those users whose registered property or properties of interest are at risk. For example, if a registered property of interest is determined to be in a risk area, a notification is sent to the corresponding user according to their registered contact information. The notification may be delivered via an email, text message or in any other suitable manner. The notification may identify the property of interest in question, a link to the infestation tracking system website, details of the pest controller that created the infestation entry, and details of the infestation itself. Alternatively, the user may be notified by a pop-up box or other notification that is delivered to their smartphone 50 directly. For example, the infestation tracking system may, upon receiving new data, check for any properties that have alarms set against them within a certain radius (such as 500 m) of that data. Such an alarm or alert feature may be free or may attract a charge, whether by unlocking the feature completely or by allowing a user to alarm a certain number of properties Primary users may include home buyers who are interested in using the infestation tracking system to assist in deciding on whether to pay for a pest inspection and to understand risk areas when looking at properties. Primary users may also include home sellers who are interested in using the infestation tracking system to assist in deciding on whether to provide a pest inspection report as a part of marketing or other material when selling their home. Primary users may also include home owners or occupiers who are interested in using the infestation tracking system to gain knowledge of the risks surrounding their property and for general interest reasons.

The infestation tracking system is typically arranged create a data provider account, such as a pest controller account, for each registered pest controller based on received pest controller account information, which may be stored in a database. A pest controller may create a pest controller account with the infestation tracking system via a web browser, smartphone application or in any other suitable manner. The pest controller account may comprise one or more of a username, password, company name, physical address, email address, phone number, fax number, and website address. This account information may be used in the advertisements illustrated in FIG. 4. A pest control company may have a plurality of employees of which a sub-account may be created for each.

The pest controller may be required to pay a daily, weekly, monthly, annual or other suitable subscription or registration fee to the infestation tracking system administrator or owner in order to have access to the infestation tracking system. The fee may be charged per company, per employee per company, or in any other suitable manner. The pest controller may be required to register for one or more particular postcodes, for example, where they work or where they would like to work, and the registration fee may depend on the number or location of the postcodes, or both.

Having access to the infestation tracking system may be advantageous for a pest controller, for example, due to the potential for new work brought in through the advertisements displayed to users and promotion of their company or business in general. Having access to the infestation tracking system may also help a pest controller better understand the risk areas and may help them decide where to target work and advertising.

The pest controller may be presented with a GUI different to the user's GUI illustrated in FIGS. 3 to 5 upon logging in to the infestation tracking system, whether on a computer or smartphone. The pest controller GUI is typically arranged to receive information about undertaken pest control work for transmission to the module and storage in the database in a suitable manner.

An account-holding pest controller may be engaged to undertake pest control work, such as fumigating or poisoning a termite colony or nest. Upon completion of such work, the pest controller can upload work data which may include information, results, a record of the work done or any other suitable information related to the infestation to the infestation tracking system, which is arranged to receive such information for processing and storage. Such work data may include one or more of a time and date (i.e. date data), the address of the property in question (i.e. address data), a range of street numbers on the street in question that the pest controller believes may be at risk, whether any pest was detected, what type of pest was detected, the size of the infestation, whether action was taken, what action was taken, and a reference or job number. Note that pest controller data may automatically be appended based on the logged in account. In some embodiments, the GUI does not allow a pest controller to enter a specific address where work was undertaken in order to prevent individual properties being identified. Rather, the GUI may allow a street number range to be entered, such as street numbers between two points (for a series of neighbouring properties) or three points (for an area of neighbouring properties). Information provided by a pest controller may need to be verified should the integrity of the information or work come into question; the pest controller may need to provide an artefact or other verifying proof in order to have the information maintained in the database. For example, a pest controller may provide an artefact such as a reference number that can be verified against an invoice, inspection paperwork or any other suitable record. This may assist in verifying the authenticity of a record that is contended by any suitable user, such as a home owner or a competing pest controller.

The module is arranged to modify or update the infestation records stored in the database upon receiving work data. New infestation data is typically created in the database upon receiving work data comprising an address that does not already exist within the infestation records. Alternatively, infestation data may be updated with a new entry upon receiving work data comprising an address that does already exist within the infestation records. Typically a data provider is not able to control the module to delete infestation data from the database. Typically, the geographical matching process is executed to determine whether submitted work data matches an existing infestation record, or whether a new infestation record needs to be created.

Other interested parties may enter into an agreement with the infestation tracking system administrator in order to access information collected by the system, which may help them to make commercial decisions. The other interested party is typically required to pay a suitable subscription or registration fee in order to access the infestation tracking system. The system administrator may charge a one-off fee for a set number of searches, a one-off or recurring fee for unlimited access, or use any other suitable structure. Third parties such as home loan lenders, banks, insurance companies, trades people, property developers and real estate investors may have a commercial or financial interest in a particular property or area and, as such, knowledge of risk or potential risk of an infestation may impact or change their commercial or financial decisions. For example, a home loan lender may be able to use the infestation tracking system to determine whether a pest inspection should be undertaken approving a home loan, where the property is in a high risk area.

The other interested party may also be able to create an account with the infestation tracking system upon paying a fee (if necessary). The other interested party is typically presented with the user GUI illustrated in FIGS. 3 to 5 upon logging in to their account, but any suitable GUI may be presented. For example, a bank may subscribe to the infestation tracking system and may access it through their internal computer system. This may allow, for example, a loan officer to quickly assess an address for infestation risk without leaving their own system. Generally, the GUI may be customisable by an infestation tracking system administrator and users may be able to negotiate for the use of a custom GUI.

Pest control suppliers may also be interested in using the termite infestation tracking system to gather information about pest controllers with whom potential relationships can be formed. Further, pest control suppliers may use the advertising space illustrated in FIG. 4 to promote their products and developments in technologies and treatments to both pest controllers and users.

The smartphone application, computer application or website may also be arranged to display general information about infestations to users or the public. For example, the system may be arranged to display articles about signs of infestation, seasonal information, treatments and preventative measures. A periodically-updating blog may be provided that provides users or the public with information on new risks, products, pest controllers, and any other suitable content. Such articles, information or a blog may be provided in a separate GUI accessible through a menu or by clicking a link on a website.

Typically, data that is made available for public viewing (whether requiring payment of a fee or not) will not include the full address or coordinates of particular properties in order to protect the privacy of property owners and other related parties.

It will be understood to persons skilled in the art of the invention that many modifications may be made without departing from the spirit and scope of the invention.

In the claims that follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such reference does not constitute an admission that such prior art forms a part of the common general knowledge in the art, in Australia or any other country.

What is claimed is:

1. An infestation tracking system comprising:
    a data receiver arranged to: i) receive work data, including data indicative of a location and whether any pest was located, from a data provider logged in to the infestation tracking system, and ii) receive (a) property data related to properties of interest from users who have subscribed to an alert system, the property data of each property of interest indicative of an address or location of the property, and (b) contact information for the user associated with the property
    a module arranged to upon receiving the work data: i) update an existing record in a database according to the received work data upon determining the record corresponds to the location based on a geographical matching process by including the received work data and automatically appending data provider data of the data provider based on the logged in account, ii) create a new record in the database according to the received work data upon determining that no record corresponding to the location exists based on a geographical matching process by including the received work data and automatically appending data provider data of the data provider based on the logged in account, and iii) responsive to receipt of the work data, determine whether any properties of interest are in a risk area corresponding to the updated record or the new record, based on a geographical matching process, and
    a data transmitter arranged to, upon the module determining that one or more properties are in a risk area, transmit a notification based on the updated record or the new record to the respective user using the contact information for the user associated with the property, the notification including details of the data provider that entered the work data, wherein the details of the data provider include at least one of a phone number, fax number, email address, physical address and website address.

2. A tracking system as claimed in claim 1 wherein the geographical matching process compares a postcode in the record to a postcode in the work data or property data to determine whether the record corresponds to the work data or property data.

3. A tracking system as claimed in claim 1 wherein the geographical matching process compares a street name in the record to a street name in the work data or property data to determine whether the record corresponds to the work data or property data.

4. A tracking system as claimed in claim 1 wherein the geographical matching process compares an area based on the record to an area based on the work data or property data to determine whether the record corresponds to the work data or property data.

5. A tracking system as claimed in claim 4 where the area is defined by a circle centered on the location or address and with a radius.

6. A tracking system as claimed in claim 5 wherein the radius of the circle depends on the pest or species in question and characteristics of a known nest or infestation.

7. A tracking system as claimed in claim 1 arranged to display advertisements on a screen of a client device.

8. A tracking system as claimed in claim 7 wherein the displayed advertisement is an advertisement for the data provider.

9. A tracking system as claimed in claim 1 wherein the data indicative of the location is derived from GPS data of a client device used to enter the work data.

10. A tracking system as claimed in claim 1 wherein the module is configured to require the user to provide an artefact such as a reference number that can be verified against an invoice or inspection paperwork in order to have information maintained in the database.

11. A tracking module arranged to:
    respond to the receipt of work data, including data indicative of a location and whether any pest was located, from a data provider logged in to an infestation tracking system by:
    updating an existing record in a database according to the received work data indicative of at least the location of an infestation or other item of interest upon determining the record corresponds to the location based on a geographical matching process by including the received work data and automatically appending data provider data of the data provider based on the logged in account,
    creating a new record in the database according to the received work data upon determining that no record corresponding to the location exists based on a geographical matching process by including the received work data and automatically appending data provider data of the data provider based on the logged in account, determine whether any properties of interest registered by users have subscribed to an alert system are in a risk area corresponding to the updated record or the new record, based on a geographical matching process, wherein the property data of each property of interest is indicative of an address or location of the property, and upon determining that one or more properties are in a risk area, cause the transmission of a notification based on the updated record or the new record, the notification including details of the data provider that entered the work data, wherein the details of the data provider include at least one of a phone number, fax number, email address, physical address and website address.

12. A tracking method comprising:

receiving at a tracking module work data indicative of at least the location a location and whether any pest was located from a data provider logged in to an infestation tracking system, updating an existing record in a database according to the received work data upon determining the record corresponds to the location based on a geographical matching process by including the received work data and automatically appending data provider data of the data provider based on the logged in account, creating a new record in the database according to the received work data upon determining that no record corresponding to the location exists based on a geographical matching process by including the received work data and automatically appending data provider data of the data provider based on the logged in account receiving at the module property data related to properties of interest from users who have subscribed to an alert system, the property data of each property of interest indicative of an address of a property or location of the property, and the contact information for the user associated with the property, responsive to receipt of the work data, determining at the module whether any properties of interest are in a risk area corresponding to the updated record or the new record, upon the module determining that one or more properties are in a risk area, transmit a notification based on the updated record or the new record to the respective user using the contact information for the user associated with the property, the notification including details of the data provider that entered the work data, wherein the details of the data provider include at least one of a phone number, fax number, email address, physical address and website address.

13. A tracking method as claimed in claim 12, wherein the geographical matching process compares a street name in the record to a street name in the work data or property data to determine whether the record corresponds to the work data or property data.

14. A tracking method as claimed in claim 12, wherein the geographical matching process compares an area based on the record to an area based on the work data or property data to determine whether the record corresponds to the work data or property data.

15. A tracking method as claimed in claim 12 where the area is defined by a circle centered on the location or address and with a radius.

16. A tracking method as claimed in any claim 12 comprising displaying advertisements on a screen of a client device.

17. A tracking method as claimed in claim 16 wherein the advertisement is an advertisement for the data provider.

18. A tracking method as claimed in claim 12 comprising deriving the data indicative of the location from GPS data of a client device used to enter the work data.

19. A tracking method as claimed in claim 12 comprising requiring the user to provide an artefact such as a reference number that can be verified against an invoice or inspection paperwork in order to have information maintained in the database.

20. A non-transitory computer readable medium comprising computer program code which when executed by a processor implements the method of claim 12.

* * * * *